(12) United States Patent
Lundgren et al.

(10) Patent No.: US 11,204,166 B2
(45) Date of Patent: Dec. 21, 2021

(54) BURNER INCLUDING AN ACOUSTIC DAMPER

(71) Applicant: Siemens Aktiengesellschaft, Munich (DE)

(72) Inventors: Jan-Erik Lundgren, Svartinge (SE); Jan Pettersson, Lotorp (SE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/621,157

(22) PCT Filed: Jun. 29, 2018

(86) PCT No.: PCT/EP2018/067612
§ 371 (c)(1),
(2) Date: Dec. 10, 2019

(87) PCT Pub. No.: WO2019/025094
PCT Pub. Date: Feb. 7, 2019

(65) Prior Publication Data
US 2020/0200390 A1 Jun. 25, 2020

(30) Foreign Application Priority Data
Jul. 31, 2017 (EP) .................................... 17184044

(51) Int. Cl.
*F23R 3/00* (2006.01)
*F23R 3/28* (2006.01)
*F02C 7/24* (2006.01)

(52) U.S. Cl.
CPC .................. *F23R 3/28* (2013.01); *F02C 7/24* (2013.01); *F05D 2240/35* (2013.01); *F05D 2260/964* (2013.01)

(58) Field of Classification Search
None
See application file for complete search history.

(56) References Cited

U.S. PATENT DOCUMENTS

| 5,431,018 A | 7/1995 | Keller |
| 2003/0031972 A1 | 2/2003 | Griffin et al. |

(Continued)

FOREIGN PATENT DOCUMENTS

| CN | 204513462 U | 7/2015 |
| CN | 106594798 A | 4/2017 |

(Continued)

OTHER PUBLICATIONS

PCT International Search Report and Written Opinion of International Searching Authority dated Nov. 30, 2018 corresponding PCT International Application No. PCT/EP2018/067612 filed Jun. 29, 2018.

*Primary Examiner* — Edwin Kang (57) ABSTRACT

A burner of a turbomachine, particularly a gas turbine engine, has at least one burner section having an annular wall surrounding a respective section of a burner interior, the annular wall including: an annular inner surface delimiting the burner interior, and a plurality of dampening cavities for the dampening of thermo-acoustic vibrations in the burner interior, each dampening cavity being connected to the annular inner surface through at least a dampening hole. A method of manufacturing such a burner includes additive manufacturing of the annular wall as an integrally formed component, or additive manufacturing of the upstream burner section, wherein the intermediate burner section and the downstream burner section as integrally formed component.

10 Claims, 5 Drawing Sheets

(56) References Cited

U.S. PATENT DOCUMENTS

| | | |
|---|---|---|
| 2005/0106519 A1 | 5/2005 | Flohr et al. |
| 2006/0207259 A1* | 9/2006 | Holt ................. F23R 3/06 60/772 |
| 2011/0265484 A1* | 11/2011 | Huber ............... F23R 3/002 60/755 |
| 2015/0082796 A1 | 3/2015 | Andersson et al. |
| 2016/0153658 A1 | 6/2016 | Xu |
| 2017/0096919 A1 | 4/2017 | Imfeld et al. |
| 2017/0268777 A1 | 9/2017 | Hase et al. |
| 2017/0268784 A1* | 9/2017 | Crawley ............ F23R 3/286 |
| 2017/0276350 A1 | 9/2017 | Schilp et al. |

FOREIGN PATENT DOCUMENTS

| | | | |
|---|---|---|---|
| CN | 106605102 A | 4/2017 | |
| CN | 106605103 A | 4/2017 | |
| DE | 3324805 A1 | 1/1985 | |
| EP | 0577862 A1 | 1/1994 | |
| EP | 1342952 A1 | 9/2003 | |
| EP | 2650612 A1 | 10/2013 | |
| EP | 2977679 A1 | 1/2016 | |
| EP | 3048370 A1 * | 7/2016 | ............ F02K 1/827 |
| EP | 3067624 A1 | 9/2016 | |
| WO | 2016036379 A1 | 3/2016 | |

\* cited by examiner

BURNER INCLUDING AN ACOUSTIC DAMPER

CROSS REFERENCE TO RELATED APPLICATIONS

This application is the US National Stage of International Application No. PCT/EP2018/067612 filed 29 Jun. 2018, and claims the benefit thereof. The International Application claims the benefit of European Application No. EP17184044 filed 31 Jul. 2017. All of the applications are incorporated by reference herein in their entirety.

FIELD OF INVENTION

The present invention relates to a burner, a combustor for a turbomachine, particularly a gas turbine engine, and a method of manufacturing a burner.

BACKGROUND OF THE INVENTION

Gas turbine engines, as one example of turbomachine, comprise as main components a compressor, a combustor, and an expansion turbine. For combustors, different designs exist, for example annular combustors or can-annular combustors. The combustor itself is comprised of a burner via which fuel is provided to a combustion space and a combustion chamber to encapsulate the combustion space. The combustion space is also provided with a fluid containing oxygen for combustion, particularly air provided from the compressor.

Burners may be designed to operate under lean conditions so that the emissions, particularly NOx and CO is kept low. Under lean condition a mix of fuel and air is considered in which all or most of the fuel is burnt. For such a lean operation typically so-called main fuel is provided. For transient operation, for example during start-up of the turbomachine, additional fuel may be provided as so-called pilot fuel to stabilise the flame and to avoid combustion dynamics.

Dry Low Emission (abbreviation DLE) technology may be used to obtain reduction of the NOx emissions.

One problem related to DLE type of combustion is the occurrence of combustion dynamic events. This phenomenon, caused by many different physical mechanisms, may result in structural damages, negative impact on emissions and significantly affect commissioning.

In general, one approach to suppress combustion dynamics is to use acoustic (passive) dampers directly installed in the combustion chamber of combustors (including both annular and can-annular combustors). Such dampers include for example Helmholtz resonators or perforated liners to directly attack the acoustic pressure in the combustion chamber.

The above solution is not yet considered optimal. One of the mechanisms related to combustion dynamics is the presence of a fluctuating fuel profile entering the combustor and in particular the combustion zone. This modulation of the fuel is caused by the subsequent acoustic events and may result in a destructive, self-driven, feed-back loop.

SUMMARY OF THE INVENTION

The present invention seeks to mitigate these drawbacks. This objective is achieved by the independent claims. The dependent claims describe advantageous developments and modifications of the invention.

In accordance with a first aspect of the invention, a burner of a turbomachine, particularly a gas turbine engine, is provided, comprising at least one burner section having an annular wall surrounding a respective section of a burner interior, the annular wall including:—an annular inner surface delimiting the burner interior, —a plurality of dampening cavities for the dampening of thermo-acoustic vibrations in the burner interior, each dampening cavity being connected to the annular inner surface through at least a dampening hole.

By this configuration, by introducing acoustic dampers in one of the burner sections, the above described feed-back mechanism is reduced and the combustion dynamics related to this kind of phenomenon suppressed.

According to the embodiments of the present invention, the at least one burner section having the annular wall is an intermediate burner section, particularly a mixing section, of the burner provided between:
an upstream burner section for providing a first fuel and fluid containing oxygen to an upstream end of a burner interior; and
a downstream burner section for providing a second fuel to a downstream end of the burner interior or to a combustion chamber.

The upstream burner section may be arranged provide to mix main fuel and air, in particular via a swirler. The downstream burner section may be arranged to provide pilot fuel. The intermediate burner section may be called a mixer or mixing section to allow better mixing of main fuel and air.

Positive effects by integrating passive acoustic dampers in an intermediate burner section are:—No unwanted air consumption will be present as these acoustic dampers which are placed up-streams the combustion zone. Thus, no negative impact on the emission levels due to unaffected (increased) flame temperature will be experienced; —If dynamic issues occur on site related to the modulation phenomenon, corresponding burner adjustment can easily be realized for that particular site; —If dynamic issues occur due to operation including different fuel specifications, proper acoustic adjustments of the burners may easily be realized to attack the problem.

In accordance with a second aspect of the invention, a combustor is provided, which comprises:—a plurality of burners, at least one burner arranged as above specified; and—at least one combustion chamber, particularly an annular or a can-annular combustion chamber, arranged downstream of the burner(s).

In accordance with a third aspect of the invention, a method of manufacturing the above defined burner is provided. Such manufacturing method includes the step of—additive manufacturing of the annular wall as an integrally formed component, or—additive manufacturing of the upstream burner section, the intermediate burner section and the downstream burner section as integrally formed component.

According to possible embodiments of the present invention, the additive manufacturing step is performed by selective laser melting or selective laser sintering.

By use of the additive manufacturing technology burners can be designed with damping devices tuned for an optimal attenuation behavior, i.e. suppressing known specific frequency intervals.

According to other possible embodiments of the present invention, each dampening cavity is connected to an annular outer surface of the annular wall through at least a purging hole.

According to further possible embodiments of the present invention, at least one of the dampening cavities has a quadrangular or hexagonal or circular profile.

The plurality of dampening cavities may distributed in the annular wall along rows and/or column to form a pattern. Said rows and/or column may be parallel or inclined with respect to a longitudinal axis of the burner.

In the above and in the following description, the terms "longitudinal", "radial" and "circumferential" are referred, when not differently specified, to a longitudinal axis of the burner.

The terms "upstream"/"downstream"/"mid(stream)" are used to indicate a direction along the longitudinal axis of the burner and are relative to a fuel flow direction. Even though some fluids will be swirled, in the end a main travel direction can be given from an upstream end of the burner to the exit (downstream end) of the burner. The exit will release the fluid into the combustion chamber, which will therefore be again downstream of the burner.

The term "interior" and "exterior" is used in respect of a radial direction of the burner, perpendicular to the longitudinal axis of the burner. A radial inwards cavity the burner interior—is surrounded radially outwards by the annular wall. Beyond that annular wall, i.e. further radially outwards, a burner exterior is defined. The burner exterior is supposed to be a hollow space to guide compressed fluid containing oxygen provided from a compressor of the turbomachine.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF THE INVENTION

The illustrations in the drawings are schematic. It is noted that in different figures, similar or identical elements or features are provided with the same reference signs. In order to avoid unnecessary repetitions elements or features which have already been described with respect to an embodiment are not described again further in the description.

Figure 1:
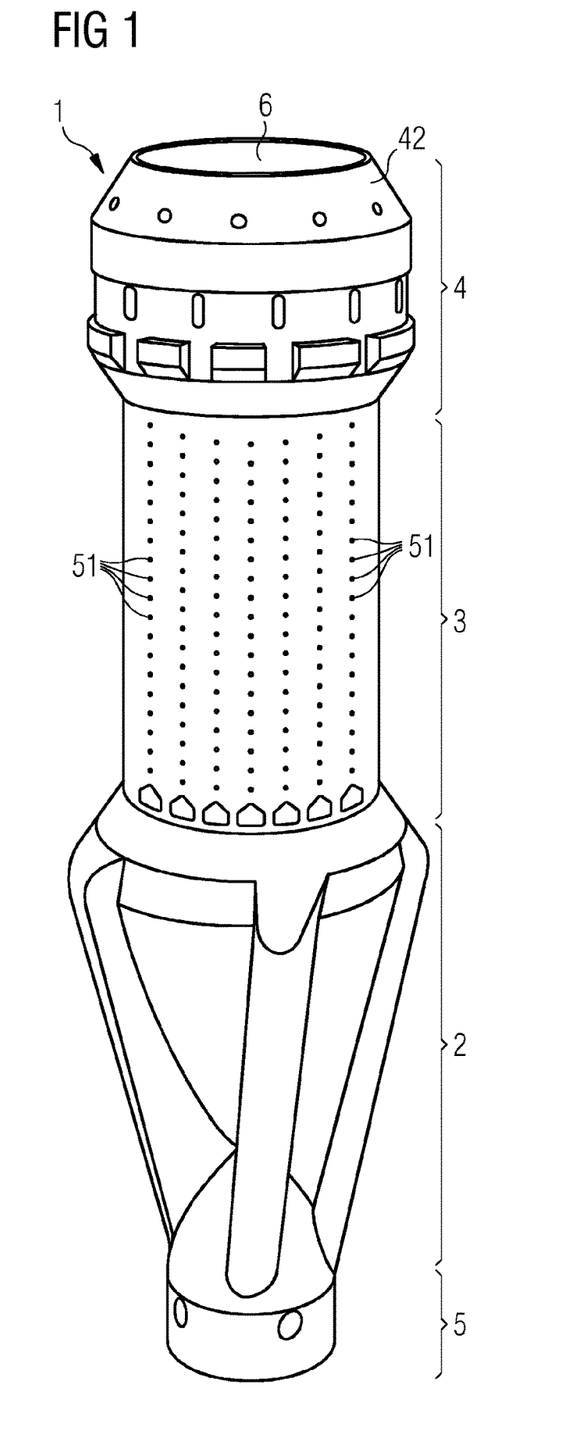
FIG. 1 shows a lateral view of an exemplary embodiment of a burner according to the present invention.

FIG. 1 represents one exemplary burner 1 according to the present invention. The burner 1 may be part of a gas turbine engine and may be used for an annular combustor. The burner 1 comprises an upstream burner section 2, an intermediate burner section 3 and a downstream burner section 4, longitudinally extended along a longitudinal axis Y of the burner 1. Upstream of the upstream burner section 2 a burner shaft 5 provides fuel to the burner 1. The upstream burner section 2 may particularly be a swirler to mix fuel with air. Following in axial direction of the burner 1, the intermediate burner section 3 follows the upstream burner section 2 and provides a premixing zone to further mix the previously provided air and fuel. Further downstream, the downstream burner section 4 is present and specifically provides also a burner tip 42. The upstream burner section 2, the intermediate burner section 3 and the downstream burner section 4 altogether enclose a burner interior 6. Further ddownstream, the burner tip 42 is connected to the combustion chamber 70 of a combustor (not represented in further detail).

The burner shaft 5, the upstream burner section 2 with the swirler, the downstream burner section 4 and the combustion chamber 70 are conventional and not a specific object of the present invention and therefore they are not described in further detail.

Figure 2:
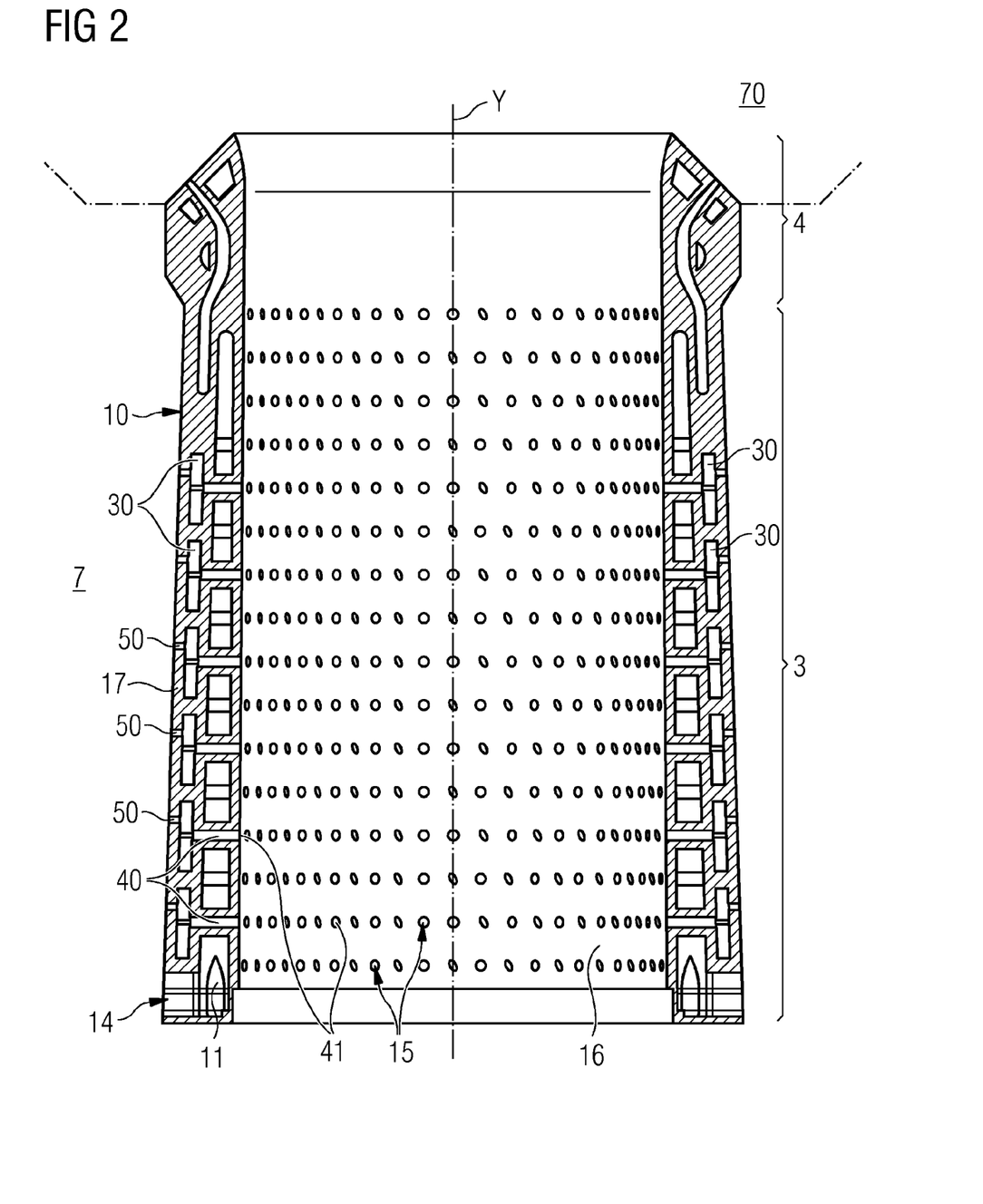
FIG. 2 shows a longitudinal section of an intermediate burner section of a burner according to the present invention.
Figure 3:
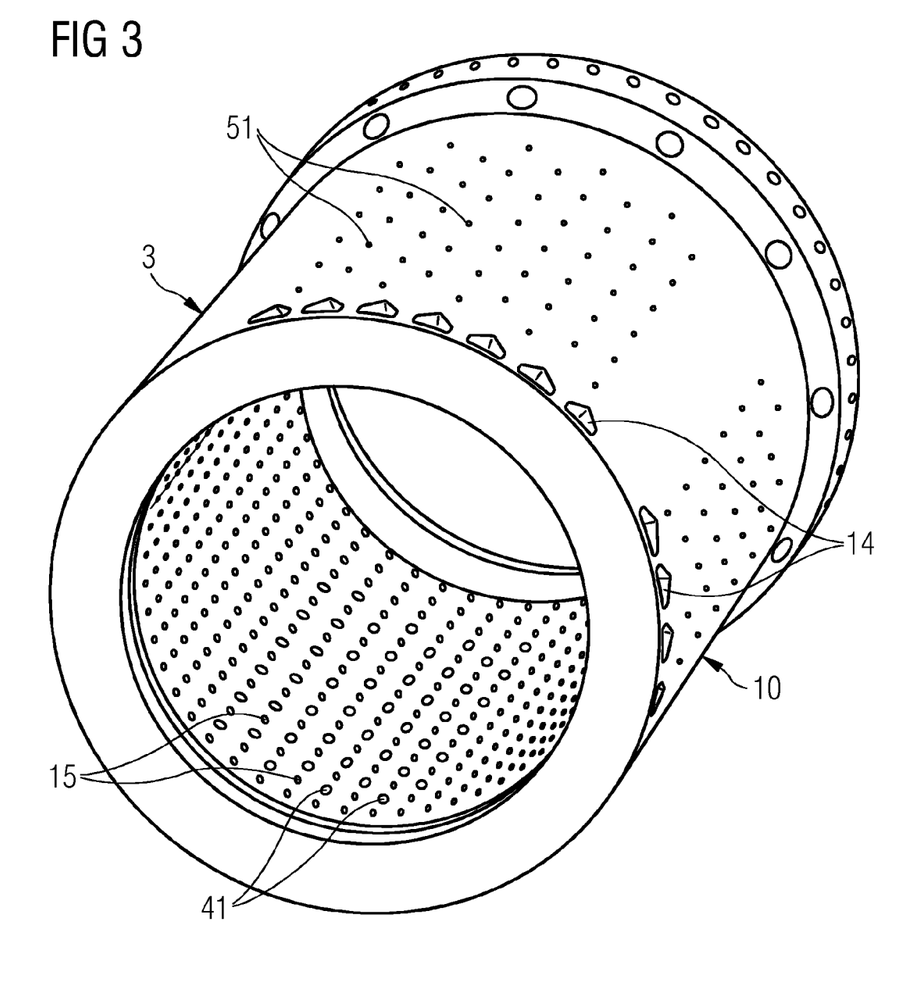
FIG. 3 shows an axonometric view of the burner section of FIG. 2.
Figure 4:
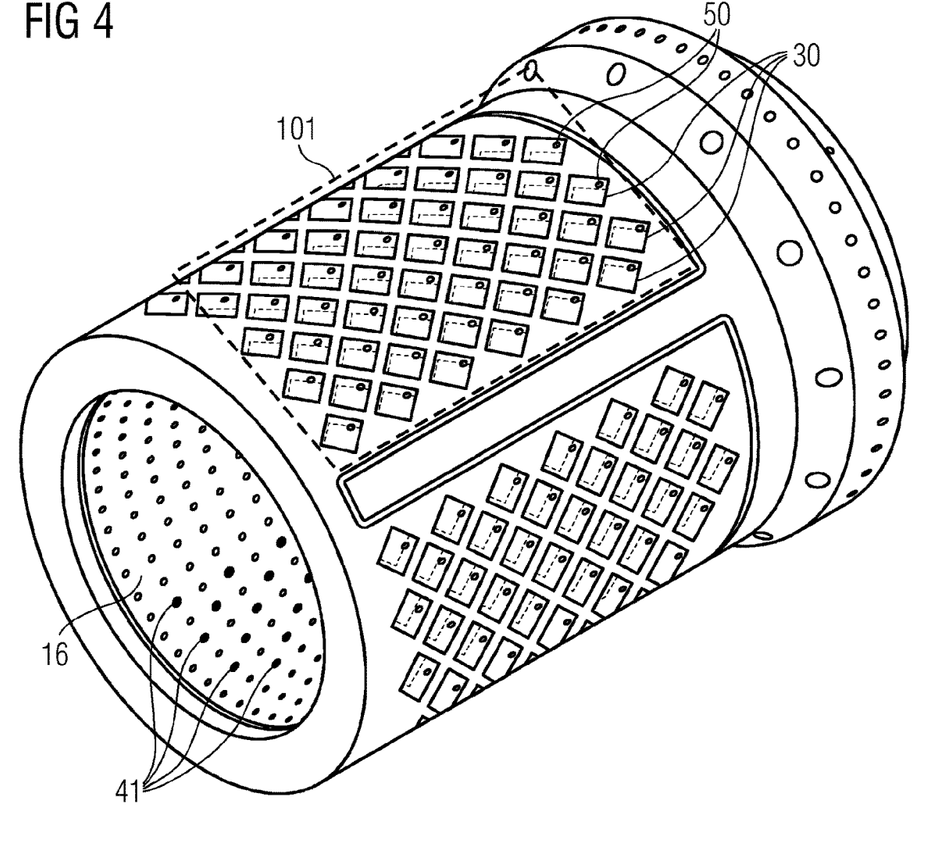
FIG. 4 shows the axonometric view of FIG. 3 without the annular outer surface to illustrate the inside of the annular wall of the intermediate burner section.

FIGS. 2 to 4 represent one embodiment of an intermediate burner section 3 according to the present invention.

In the embodiment, the intermediate burner section 3 substantially is configured as a cylindrical annular wall 10 around the longitudinal axis Y of the burner 1. The annular wall 10 may also be shaped differently, as long as being annular around a space. The annular wall 10 surrounds an intermediate section of the burner interior 6. The annular wall 10 includes an annular inner surface 16 delimiting intermediate section of the burner interior 6 and an annular outer surface 17 of the annular wall 10 in contact with an exterior environment 7.

The annular wall 10 comprises an annular cooling fluid passage 11. To provide air into the annular cooling fluid passage 11, a plurality of cooling fluid inlet holes 14 are present in the annular wall 10, provided on the annular outer surface 17 in a position longitudinally proximal to the upstream burner section 2. The annular cooling fluid passage 11 extends the cooling fluid inlet holes 14 to a plurality of effusion holes 15 provided on the annular inner surface 16.

The annular wall 10 further comprises a plurality of dampening cavities 30 for the dampening of thermo-acoustic vibrations in the burner interior 6. Each dampening cavity 30 is connected to the annular inner surface 16 through a respective dampening hole 40. Each dampening hole 40 comprises a dampening opening 41 on the annular inner surface 16.

Each dampening cavity 30 represents a Helmholtz resonator having the following main geometrical parameters:— the volume Vc of the dampening cavity 30,—the cross sectional area A of the dampening hole 40,—the length L of the dampening hole 40.

Each dampening cavity 30 can be used to suppress a frequency f of the thermo-acoustic vibrations in the combustion gas inside the volume V, the frequency f being proportional to squared root of the ratio between area A and the product of volume Vc by the length L, i.e. in symbols: f~sqrt(A/(Vc*L)).

Each dampening cavity 30 is further connected to the annular outer surface 17 through a respective purging hole 50. Each purging hole 50 comprises a purging opening 51 on the annular outer surface 17.

According to other possible embodiments of the invention (not shown in the attached figures) the purging holes 50 are not present.

Each dampening cavity 30 is delimited by two base surfaces 31, 32, respectively radially internal and external, and one or more lateral surfaces 33, radially connecting the two base surfaces 31, 32. The two base surfaces 31, 32 may be, as shown in the embodiment of the attached figures FIGS. 2 to 4, oriented substantially parallel to the annular inner surface 16 and/or the annular outer surface 17.

According to respective embodiments of the present invention, the two base surfaces 31, 32 may have respective profiles. In particular the two base surfaces 31, 32 may a quadrangular profile (FIGS. 4 and 5), an hexagonal profile (FIG. 6), a circular or elliptical profile (FIG. 7).

More in general, according to other embodiments (not shown) of the present invention, the tri-dimensional shape of each dampening cavity 30 may be arbitrary, e.g. globe, conical, rectangular, honeycomb, etc. The shapes of the dampening hole 40 and of the purging holes 50 may be round or oval, etc.

According to respective embodiments of the present invention, the plurality of dampening cavities 30 may be distributed in the annular wall 10 along rows and/or column (represented by an axial orientation X) to form a plurality of respective patterns 101, 102, 103.

Figure 5:
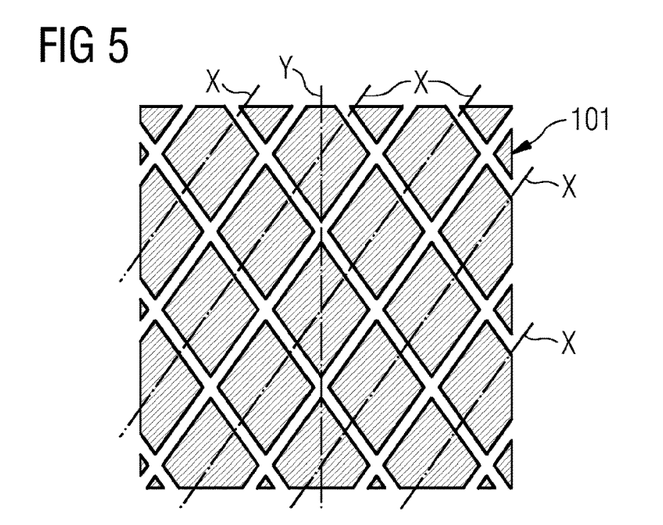
FIG. 5 schematically illustrates a first pattern for the dampers inside the annular wall of the intermediate burner section.

With reference to the embodiment in FIGS. 4 and 5, a plurality of dampening cavities 30 having quadrangular, in particular diamond shape are distributed according to a first pattern 101 comprising a plurality of rows (or columns) X inclined with respect to the longitudinal axis Y of the burner 1.

Figure 6:
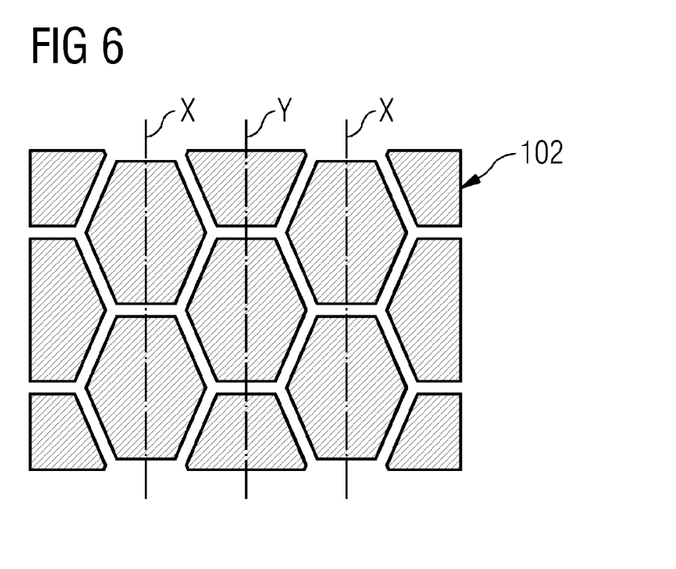
FIG. 6 schematically illustrates a second pattern for the dampers inside the annular wall of the intermediate burner section.
Figure 7:
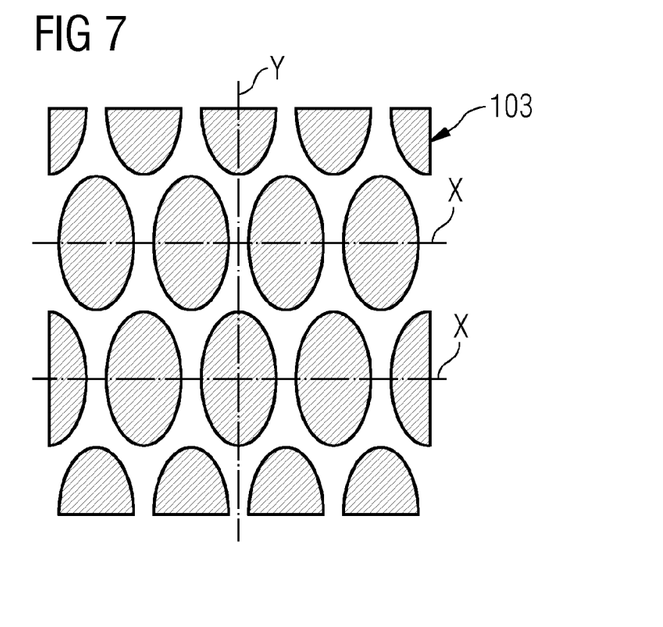
FIG. 7 schematically illustrates a third pattern for the dampers inside the annular wall of the intermediate burner section.

With reference to the embodiment in FIG. 6, a plurality of dampening cavities 30 having hexagonal shape are distributed according to a second pattern 102 comprising a plurality of rows (or columns) X parallel to the longitudinal axis Y of the burner 1.

With reference to the embodiment in FIG. 7, a plurality of dampening cavities 30 having elliptical shape are distributed according to a third pattern 103 comprising a plurality of rows (or columns) X orthogonal with to the longitudinal axis Y of the burner 1.

The annular wall 10 and particularly dampening cavity 30, the dampening holes 40 and the purging holes 50 may be built by additive manufacturing techniques, for example by selective laser melting, selective laser sintering, electron-beam melting, selective heat sintering, or electron beam freeform fabrication. The additive manufacturing techniques advantageously permits to manufacture a great variety of dampening cavity 30 shapes and patterns. Some possible examples of such variety are described above and shown in the attached figures.

The invention claimed is:

1. A burner of a turbomachine or a gas turbine engine, comprising:
   an upstream burner section for providing a first fuel and a fluid containing oxygen to an upstream end of a burner interior;
   at least one intermediate burner section having an annular wall surrounding a respective section of the burner interior; and
   a downstream burner section for providing a second fuel to a downstream end of the burner interior or to a combustion chamber;
   wherein the annular wall comprises:
   an annular inner surface delimiting the burner interior,
   a plurality of dampening cavities for dampening of thermo-acoustic vibrations in the burner interior, each dampening cavity being connected to the annular inner surface through at least a dampening hole, wherein each dampening cavity is connected to an annular outer surface of the annular wall through at least a purging hole, and
   an annular cooling fluid passage extending from an annular row of cooling fluid inlet holes provided on the annular outer surface to a plurality of effusion holes provided on the annular inner surface;
   wherein the annular row of cooling fluid inlet holes is the only annular row of cooling fluid inlet holes; and
   wherein the purging hole of each dampening cavity is downstream of the annular row of cooling fluid inlet holes.

2. The burner according to claim 1, wherein at least one of the plurality of dampening cavities has a quadrangular profile.

3. The burner according to claim 1, wherein at least one of the plurality of dampening cavities has a hexagonal profile.

4. The burner according to claim 1, wherein at least one of the plurality of dampening cavities has a circular profile.

5. The burner according to claim 2,
   wherein the plurality of dampening cavities are distributed in the annular wall along rows and/or columns to form a pattern.

6. The burner according to claim 5, wherein said rows or columns are parallel to a longitudinal axis of the burner.

7. The burner according to claim 5, wherein said rows and/or columns are inclined with respect to a longitudinal axis of the burner.

8. A combustor, comprising:
   a plurality of burners, wherein at least one burner of the plurality of burners comprising:
   an upstream burner section for providing a first fuel and a fluid containing oxygen to an upstream end of a burner interior;
   at least one intermediate burner section having an annular wall surrounding a respective section of the burner interior; and
   a downstream burner section for providing a second fuel to a downstream end of the burner interior or to at least one combustion chamber;
   wherein the annular wall comprises:
   an annular inner surface delimiting the burner interior,
   a plurality of dampening cavities for dampening of thermo-acoustic vibrations in the burner interior, each dampening cavity being connected to the annular inner surface through at least a dampening hole, wherein each dampening cavity is connected to an annular outer surface of the annular wall through at least a purging hole, and an annular cooling fluid passage extending from an annular row of cooling fluid inlet holes provided on the annular outer surface to a plurality of effusion holes provided on the annular inner surface;

wherein the annular row of cooling fluid inlet holes is the only annular row of cooling fluid inlet holes;

wherein the purging hole of each dampening cavity is downstream of the annular row of cooling fluid inlet holes; and wherein the at least one combustion chamber is arranged downstream of the at least one burner.

9. A method of manufacturing a burner, the method comprising:

providing an upstream burner section for providing a first fuel and a fluid containing oxygen to an upstream end of a burner interior;

providing at least one intermediate burner section having an annular wall surrounding a respective section of the burner interior; and providing a downstream burner section for providing a second fuel to a downstream end of the burner interior or to a combustion chamber;

wherein the annular wall comprises:

an annular inner surface delimiting the burner interior, a plurality of dampening cavities for dampening of thermo-acoustic vibrations in the burner interior, each dampening cavity being connected to the annular inner surface through at least a dampening hole, wherein each dampening cavity is connected to an annular outer surface of the annular wall through at least a purging hole, and an annular cooling fluid passage extending from an annular row of cooling fluid inlet holes provided on the annular outer surface to a plurality of effusion holes provided on the annular inner surface;

wherein the annular row of cooling fluid inlet holes is the only annular row of cooling fluid inlet holes;

wherein the purging hole of each dampening cavity is downstream of the annular row of cooling fluid inlet holes; and additive manufacturing of the annular wall as a first integrally formed component, or additive manufacturing of the upstream burner section, the intermediate burner section and the downstream burner section as a second integrally formed component.

10. The method according to claim 9, wherein the additive manufacturing of the first or second integrally formed component is performed by selective laser melting or selective laser sintering.

* * * * *